Oct. 20, 1970 W. HAW 3,535,643

DUAL SIMULTANEOUS PULSE COMPRESSION WITH A SINGLE DISPERSIVE DELAY LINE

Filed Oct. 24, 1967

DELAY TIME vs INPUT FREQUENCY

LOG MAGNITUDE vs INPUT FREQUENCY

PULSE COMPRESSION INPUT-OUTPUT SIGNAL RELATIONS

SIGNALS AT TERMINALS X AND Y

WAILY HAW
INVENTOR.

BY J. M. St. Amand

ATTORNEY 3,535,643

DUAL SIMULTANEOUS PULSE COMPRESSION WITH A SINGLE DISPERSIVE DELAY LINE

Waily Haw, Fullerton, Calif., assignor to the United States of America as represented by the Secretary of the Navy Filed Oct. 24, 1967, Ser. No. 677,799
Int. Cl. H03k 5/159
U.S. Cl. 328—56 4 Claims

ABSTRACT OF THE DISCLOSURE

A single dispersive delay line is used with gating circuits for processing two independent signals which are occurring simultaneously in time and which consist of the same frequency spectrum without any undesirable interactions. The relative phase and magnitude characteristics between both signals are preserved since each signal is operated on by the same transfer function.

The invention herein described may be manufactured and used by or for the Government of the United States of America for governmental purposes without the payment of any royalties thereon or therefor.

Previously, where the relative phase and magnitude characteristics of two independent signals were to be preserved during the process of pulse compressions, a dispersive delay line was required for processing each independent signal. Therefore, two closely matched dispersive delay lines were required. This previous approach had the following limitations and disadvantages: (a) the system required two dispersive delay lines; (b) closely matched delay lines operating at the same temperature do not necessarily have identical phase and attenuation characteristics, therefore, each signal would be operated on by a different transfer function; (c) additional phase-shifting and amplitude-shaping networks have been necessary for closely matching the phase and attenuation characteristics of the delay lines; (d) Under changing temperature conditions, the difference between the phase and attenuation characteristics of closely matched delay lines may vary; (e) If the relative phase and amplitude characteristics of the two independent signals can not be preserved sufficiently well, the system performance deteriorates; and (f) Specification requirements for matched delay lines make the delay lines more expensive. These disadvantages are overcome by the present invention where a single dispersive delay line is used with gating circuits for processing two independent signals which are occurring simultaneously in time and which consist of the same frequency spectrum. The first signal is applied to one end of a dispersive delay line through an input gate and the processed output signal is received from the other end of the delay line through an output gate. The second signal is handled similarly except that its input and output terminals are at opposite ends of the delay line to those of the first signal. Since the principle of superposition prevails, both signals are processed simultaneously by the dispersive delay line with no undesirable interaction.

Figure 1:
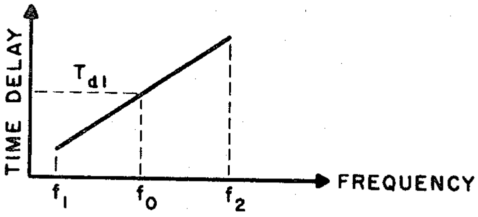
FIG. 1 shows the linear relationship between input signal frequency and delay time of the output signal for a dispersive delay line.
Figure 2:
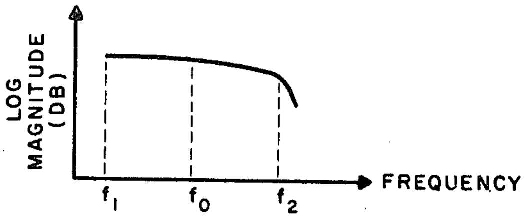
FIG. 2 is a curve showing Log Magnitude vs. Input Frequency.
Figure 3:
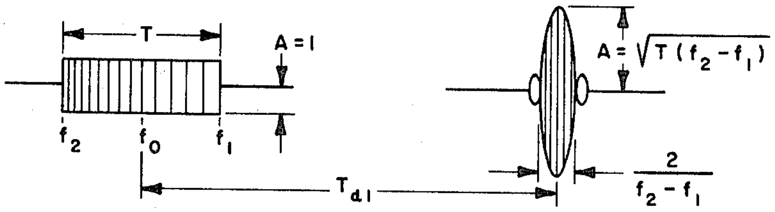
FIG. 3 shows pulse compression Input-Output signal relations for a dispersive delay line.

A dispersive delay line is a passive device having a transfer function characterized by a linear relationship between the input signal frequency and the delay time of the output signal as depicted in FIG. 1. In addition, the magnitude response is similar to that of a low-pass filter as shown in FIG. 2. If a linearly modulated FM pulse with a rectangular envelope is applied to a dispersive delay line, the transfer function causes each frequency component of the pulse to be phase-shifted such that the resulting output signal is a frequency modulated compressed pulse with a $(\sin x)/x$ envelope. Thus, pulse compression is achieved. The relationships of the input and output signals are shown in FIG. 3.

The present invention provides a method whereby two signals can be simultaneously processed by the same dispersive delay line.

Figure 4:
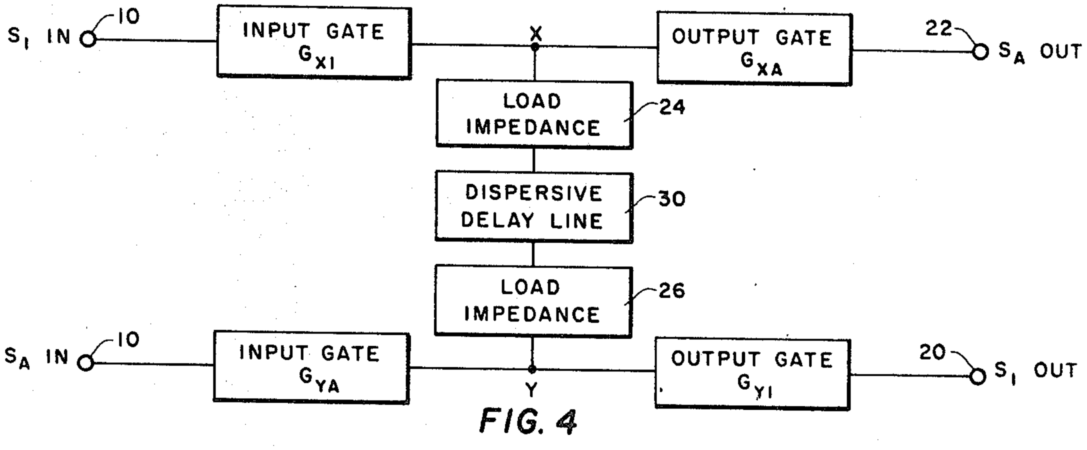
FIG. 4 is a block diagram of the invention.

A functional block diagram of the invention is shown in FIG. 4. $S_{\text{Iin}}$ and $S_{\text{Ain}}$ are the input signals applied to respective input terminals 10 and 12 and requiring pulse compression; $S_{\text{Iout}}$ and $S_{\text{Aout}}$ are the compressed pulse output signals at respective output terminals 20 and 22. $G_{XI}$ and $G_{YA}$ are the input gate circuits; $G_{XA}$ and $G_{YI}$ are the output gate circuits. For this illustration, it is assumed that all the gates are normally closed i.e. non-conducting.

Figure 5:
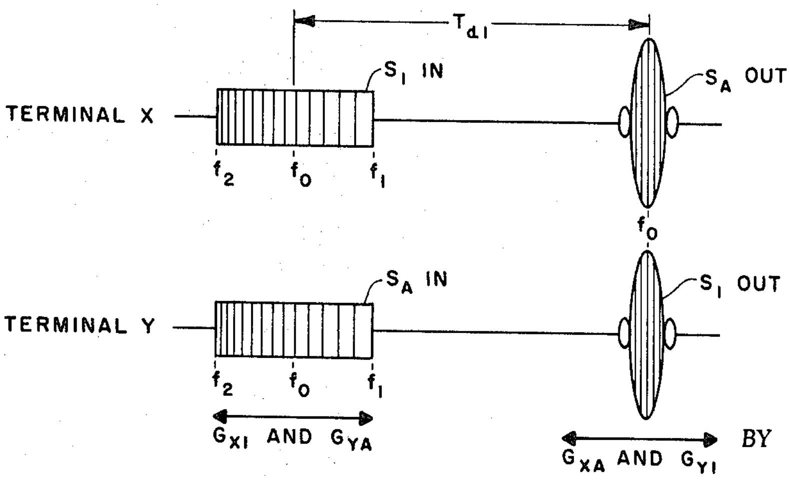
FIG. 5 shows the signals at terminals X and Y of FIG. 4.

The signals at terminals X and Y and their time relationships are depicted in FIG. 5. Also shown are the time sequences indicating when each gate is opened i.e. conducting. For this illustration, it is assumed that the input signals are identical and occurring simultaneously in time. Load impedances are represented by impedances 24 and 26.

The input gates are simultaneously opened to permit $S_{\text{Iin}}$ to be applied to one end of dispersive delay line 30 through terminal X while $S_{\text{Ain}}$ is being applied to the other end of dispersive delay 30 line through terminal Y. Since the dispersive delay line characteristics are bilateral, both input signals are simultaneously operated upon due to the principle of superposition. After the time of delay, the output gates $G_{XA}$ and $G_{YI}$ are then simultaneously opened to permit the respective compressed output pulses $S_{\text{Aout}}$ and $S_{\text{Iout}}$ to be passed on to other circuits.

A new feature of importance is this invention permits two independent signals occurring simultaneously in time to be processed simultaneously by a single delay line without any undesirable interactions. Since only a single delay line is required, both independent signals are operated on by the same transfer function. Therefore, the relative phase and magnitude characteristics of the two signals can easily be preserved and the problems of closely matching two dispersive delay lines can be avoided. In addition, an economic advantage results since the required number of dispersive delay lines for the system is reduced.

This invention is not limited for use with only a dispersive delay line. Any delay line can be used to process signals providing it has bilateral characteristics. Also, the invention is not limited to handling only two independent signals which are occurring simultaneously in time. Any number of signals can be handled providing the time sequence of the signals appearing at a terminal X or Y of the delay line is such that all gates connected to the terminal can be opened or closed for properly passing or blocking the desired signal as dictated by the particular application. Where applicable, tapped delay lines can be used for increasing the number of available delay line terminals.

Obivously many modifications and variations of the present invention are possible in the light of the above teachings. It is therefore to be understood that within the scope of the appended claims the invention may be practiced otherwise than as specifically described.

What is claimed is:

1. A system for pulse compression by a single delay line of two independent signals occurring simultaneously in time while preserving the relative phase and magnitude characteristics of the two independent signals, comprising:

(a) a first input gate circuit and a second input gate circuit for gating respective independent first and second input signals applied thereto,
(b) a first output gate circuit and a second output gate circuit,
(c) a delay line,
(d) a first delay line terminal and a second delay line terminal,
(e) the output of said first input gate circuit being connected to the input of said first output gate circuit and to said first delay line terminal,
(f) the output of said second input gate circuit being connected to the input of said second output gate circuit and to said second delay line terminal,
(g) said delay line connected between said first and second delay line terminals, wherein said first and second independent signals occurring simultaneously in time are applied to said first and second input gate circuits respectively and said input gate circuits are opened simultaneously to permit said first input signal to be applied to one end of said delay line at said first terminal and said second input signal applied to the other end of said delay line at said second terminal both signals are simultaneously operated on by said delay line, and after the time of delay said first and second output gate circuits are simultaneously opened to permit respective first and second compressed signal to be passed on to other circuits, said first signal at the output of said second gate circuit and said second signal at the output of said first gate circuit.

2. A system as in claim 1 wherein said delay line is a dispersive delay line.

3. A system as in claim 1 wherein a said delay line is a tapped delay line for increasing the number of available delay line terminals.

4. A system as in claim 1 wherein said delay line has bilateral characteristics.

References Cited

UNITED STATES PATENTS 3,111,557 11/1963 Scott et al. ---------- 179—15

STANLEY D. MILLER, Primary Examiner

U.S. Cl. X.R.

179—15.55; 333—7, 29; 343—17.2